United States Patent [19]

Shaw et al.

[11] 4,105,903
[45] Aug. 8, 1978

[54] SAFETY LID INTERLOCK CIRCUIT FOR CENTRIFUGES

[75] Inventors: Gustavus W. Shaw, Havertown; Raymond P. Walker, Malvern, both of Pa.

[73] Assignee: American Home Products Corporation, New York, N.Y.

[21] Appl. No.: 750,032

[22] Filed: Dec. 13, 1976

[51] Int. Cl.² ........................................... H01H 83/00
[52] U.S. Cl. ................................. 307/328; 210/146; 233/1 B; 307/119; 307/131
[58] Field of Search ............... 307/328, 326, 327, 125, 307/119, 61.45 R, 120, 130, 131, 116; 233/1 B; 200/61.45 R; 210/146; 340/271

[56] References Cited

U.S. PATENT DOCUMENTS 3,163,600  12/1964  Buss ....................................... 210/146
3,633,041  1/1972  Koskela ................................ 307/119

Primary Examiner—Robert K. Schaefer
Assistant Examiner—Morris Ginsburg
Attorney, Agent, or Firm—Joseph Martin Weigman

[57] ABSTRACT

The disclosure is directed to a lid latch concealed in a tamper-proof enclosure and a centrifuge interlock circuit which prevents the opening of the lid latch until the rotor has come to a full stop, and which requires electrical power to release the latch. Rotation is detected by a low level direct current applied through a sensing resistor to the brushes of the drive motor, after drive power to the motor has been cut off. Any rotation will cause rapid modulations of the current through the sensing resistor, which develop a corresponding signal voltage across the resistor. The signal voltage is amplified and applied to trigger a clamp circuit, which overrides a lid latch release device until rotary motion has ceased.

5 Claims, 7 Drawing Figures

SAFETY LID INTERLOCK CIRCUIT FOR CENTRIFUGES

This invention relates to safety circuits for rotating equipment and more particularly relates to a safety interlock circuit for use on laboratory centrifuges in conjunction with a tamper-proof enclosure surrounding a latching device. The circuit is especially useful in retrofitting laboratory centrifuges which are supplied by the manufacturer without means to prevent the lifting of the centrifuge lids before the rotating members have come to a complete halt.

Some centrifuges are supplied with safety interlocks related to indicators showing rotation speed. Such indicators are typically inaccurate, insensitive and unsuitable for detecting motion when the centrifuge is rotating slowly, and therefore permit premature lifting of the cover while rotor is spinning at a slow, but still dangerous rate.

It is an object of the present invention to provide a safety interlock circuit which may be easily installed on laboratory centrifuges without altering the critical balance of the rotating parts or the existing speed control and timing circuitry.

It is another object of the present invention to provide improved circuitry for preventing the opening of rotating devices, such as centrifuges, until they are completely stopped.

It is a further object of the present invention to provide a latch concealed in a tamper-proof enclosure which can only be operated by an interlock circuit and cannot be mechanically bypassed thru manipulations by an operator.

It is a particular object of the present invention to provide a centrifuge safety interlock circuit which requires power to unlatch the system so that the system may not be avoided and opened by disconnecting the electrical power while the centrifuge is rapidly rotating.

The objects of the present invention may be obtained by sensing rotary motion by detecting electrical noise voltages generated by the sliding contact of motor brushes against a rotating commutator after the driving power has been shut off. To accomplish this, a low level direct current, typically less than one tenth of an ampere, is passed through the motor via a sensing resistor after the main power drive is shut off. The resulting noise voltage is developed from a resistor connected in series with the sliding contacts or brushes of the motor, which is then amplified and fed to trigger a clamp circuit. The clamp circuit prevents the operation of a cover release latch and thus prevents opening of the protective cover until the brush noise has ceased. The low direct current used causes no apparent change in the time required for the rotor to come to rest. Also, the circuit is arranged so that the normal braking of the rotor is not interfered with. The cover release latch is protected by a tamper-proof enclosure so that it may not be taped over or externally manipulated to open the cover.

Principle of Motion-Sensing Circuitry

Drive motors used in centrifuge devices are typically of the series motor type, in which there is a rotating armature with commutator and brushes connected in series with a set of stationary field coils surrounding the armature.

The centrifuge head is typically mounted directly on the shaft of the drive motor, with the shaft positioned in a vertical attitude. In some instances the drive motor shaft is coupled to the vertical centrifuge rotor spindle through a system of pulleys and a V-belt. This motion-sensing arrangement will perform equally well in either situation.

In this arrangement, the centrifuge drive motor is disconnected from the normal variable AC voltage source by means of a switching arrangement (mode switch), and a low voltage (6v.) DC source is transferred to the drive motor terminals through a series sensing resistor (approximately 660 ohms). With the centrifuge at a standstill condition, contact between the motor brushes and the commutator is motionless and the current flow thru the sensing resistor and the motor will be stable (unvarying). During any period of rotation of the motor shaft, the brushes will be making a sliding contact against the commutator segments, which causes the current flow to vary in an erratic pulsating manner. This pulsating current which must also flow through the sensing resistor causes a corresponding changing voltage to appear across the sensing resistor until the motor comes to rest and the current stabilizes as before.

The erratic, pulsating voltage at the sensing resistor is amplified to approximately 20 volt peak amplitude and is applied to trigger a clamping circuit, which in effect prevents operation of a relay that in turn controls power to a solenoid operated, latch release mechanism. This mechanism enables opening of centrifuge cover only after motor rotation has ceased. When the pulsations due to rotations cease, the clamping action is no longer triggered and the operation of the relay and latch solenoid are no longer blocked from operation and the cover latch release can be accomplished. An indicator light maybe provided to show when motion has ceased and cover may be safely opened.

The following are features of this invention.
1. This system provides improved operator safety because it can reliably and consistently detect the existence of all rotational motion until motion has ceased.
2. An important and desirable feature is that this system does not require any additions to or modifications of the rotating members, and thus the original carefully balanced status of the rotating parts remains undisturbed and unaltered. This is particularly important where very high speeds are involved.
3. This system features simplicity and convenience of operation. Widely differing varieties of rotor heads may be freely interchanged in normal fashion without impairing the efficiency or reliability of the motion sensing circuitry. Changing or re-positioning and re-adjustment of a motion sensing pick-up accessory is not involved when centrifuge rotor head changes are made.
4. Productive efficiency is increased when a series of runs are to be made, since this system provides prompt indication, by indicator light, the moment it is safe to open the cover.

Other and further objects of the invention will be apparent from reading the following description in conjunction with the drawings in which:

FIG. 1 is a block diagram of the safety interlock circuit;

FIGS. 2, 3, and 4 are circuit diagrams of portions of FIG. 1;

Figure 1:
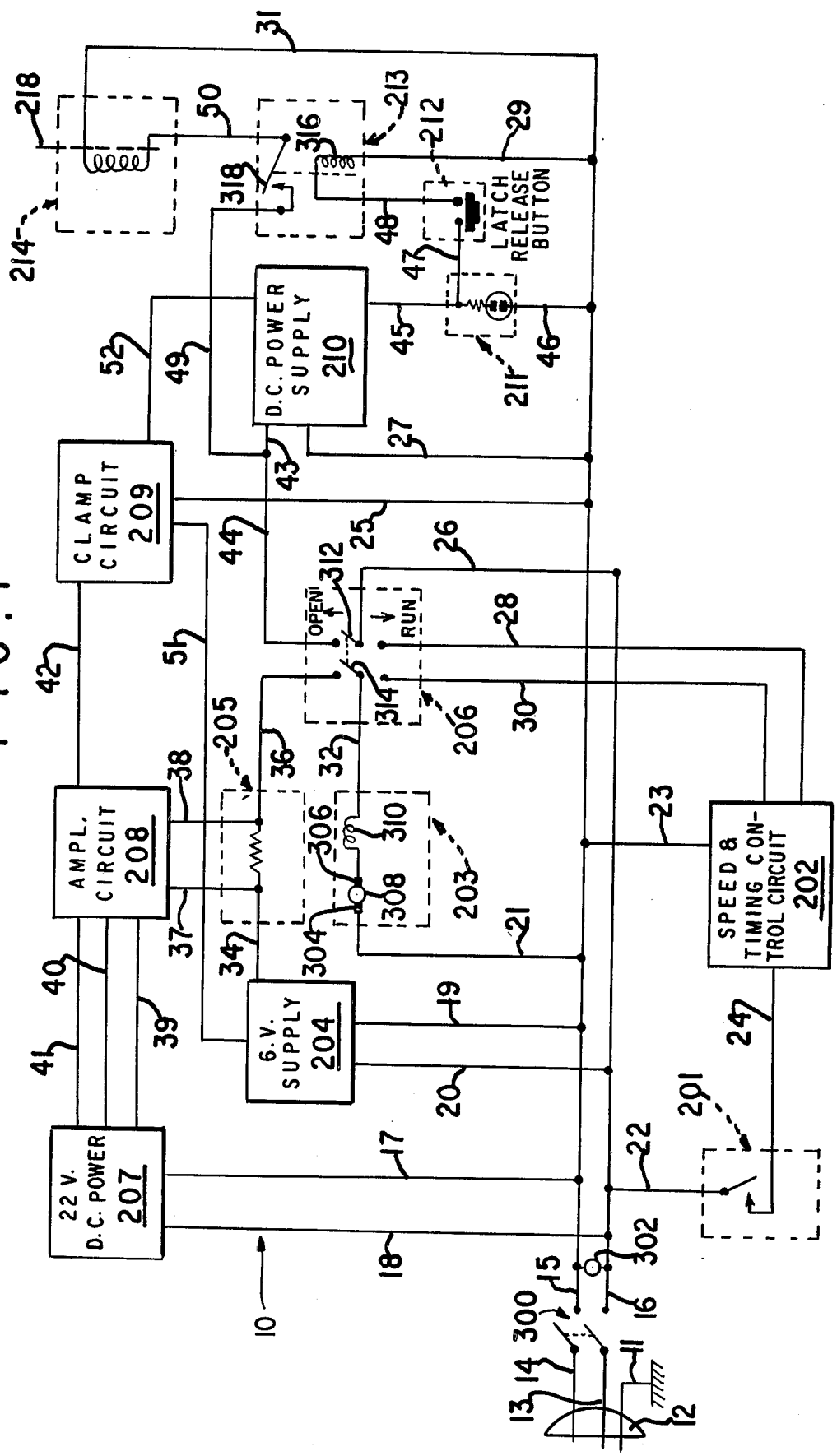

A safety interlock circuit 10 is shown in block diagram form in FIG. 1. The circuit is connected to a source of 115 volt alternating current power by means of a standard 3-wire power cord and grounding type plug 12. A safety grounding conductor 11 is connected directly to the frame of the centrifuge, while a power conductor 14 and a neutral conductor 13 are connected to common power leads, 16 and 15 respectively, when a main switch 300 is closed. Alternating current is thereby provided to light a pilot light 302 and simultaneously energize two direct current power supply sections, 204 through conductor 19 and 20, and 207 through conductors 17 and 18. The neutral conductor 15 is also connected by a conductor 21 to a brush 304 of a motor 203 (which also has a second brush 306, a commutator 308 and field coils 310) and to speed and timing control circuitry 202 by conductor 23, to a clamp circuit 209 by conductor 25, to a 100 volt direct current power supply 210 by conductor 27, to a latch control relay coil 213 by conductor 29 and to a latch release solenoid 214 by conductor 31.

Figure 6:
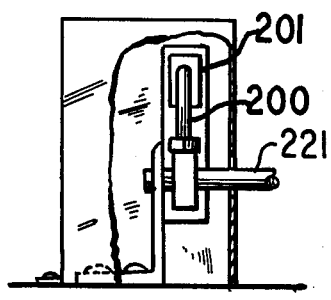
FIG. 6 is a detail view of the microswitch of FIG. 5.
Figure 7:
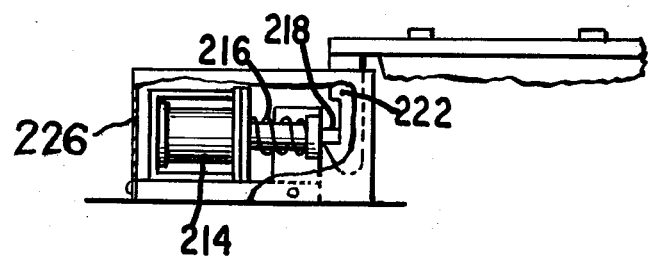
FIG. 7 is a detail view of the latch of FIG. 5 with the tamper-proof enclosure partly cut away.

Operation of the centrifuge while the cover is opened is prevented by means of cover interlock switch 201, which is held in an open position by cam 200 connected to camshaft 221 (FIG. 6) until cover 220 (FIG. 5) is closed rotating the camshaft 221 and the latch 222 is engaged (FIG. 7), whereupon the cover interlock switch 201 then closes and allows alternating current to flow from conductor 16 through conductors 22 and 24 to the speed and timing control circuitry 202. The latch 222 is protected by enclosure 226 which prevents tampering with the latch when in the closed position.

With mode switch 206 in "run" position, power conductor 16 provides alternating current through conductor 26, thru switch arm 312 and conductor 28 to speed and timing control circuitry 202 enabling no-voltage release relay (not shown) to close and permit adjustable output power to flow through conductor 30 to arm 314 of mode switch 206 and then through conductor 32 to energize the centrifuge drive motor 203.

To open the cover 220, after centrifuge running time has been accomplished, the speed control 202 is returned to "off" position and the mode switch 206 is changed from "run" to "open" position. This enables a DC sensing current to flow from the 6 volt DC supply 204 through conductor 34, through sensing resistor 205, to mode switch 206 through conductor 36, through mode switch arm 314, conductor 32, through drive motor coils 310, brushes 304, 306 and commutator 308, and complete the circuit to 6 v. supply 204, through conductors 21, 15 and 19, in that order. Until the drive motor rotation ceases, the sliding contact of the brushes against the rotating commutator causes this current flow to vary in an erratic manner. Such changes create corresponding changes in signal voltage across the sensing resistor 205. This small signal voltage is fed through conductors 37 and 38 to a high gain, solid state amplifier 208 which increases the signal level to approximately 20 volts peak value. Power for this amplifier circuitry is supplied by 22 volt DC power supply section 207 through conductors 39, 40 and 41.

Figure 5:
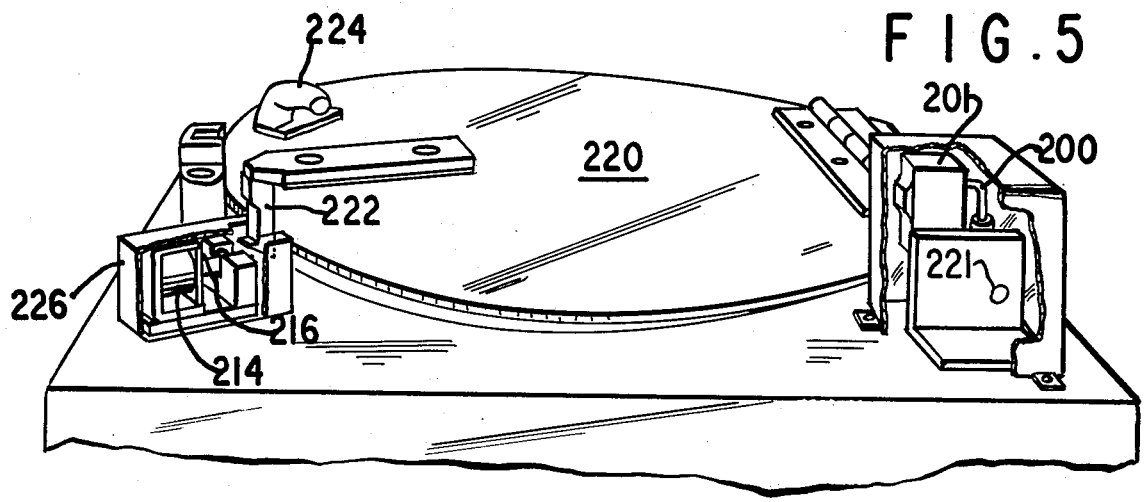
FIG. 5 is a perspective view of a latching mechanism embodying the present invention with a tamper-proof enclosure partly cut away.

With the centrifuge at a stand-still condition, the unlatching and opening of the cover is accomplished as follows: Placing mode switch 206 in the "open" position allows alternating current to flow from common conductor 16 through conductor 26 to mode switch 206, through arm 312 of mode switch 206 to conductor 44 which energizes a power supply 210 through conductor 43, also providing alternating current to the latch control relay contact 213 through conductor 49. The power supply 210 builds up to a normal value (approximately 100 to 110 volts) and provides its output power, through conductor 45, to energize the "safe" indicator light 211, with that circuit completed to common neutral conductor 15 through conductor 46. Latch release push button 212 is also provided with 100 volt direct current through conductor 47, and when button 212 is pressed, conductor 48 conducts direct current to energize coil 316 in the latch control relay 213 circuit, which is completed to the neutral conductor 15 through conductor 29. This causes contact 318 of relay 213 to close and alternating current flows through conductor 50, thru latch release solenoid 214 and through conductor 31 to the neutral conductor 15. The solenoid overcomes plunger spring 216 (FIG. 7) and the latch release plunger 218 is thereby moved from the latched position to the unlatched position which permits the cover 220 to be opened with handle 224 (FIG. 5). While the centrifuge is at a standstill, the clamp circuitry 209 will not have any significant influence on the output voltage of power supply section 210.

When the centrifuge is in motion, the brushes will be sliding against the drive motor commutator 308, and the amplifier 208 will then be providing a rapidly pulsating output signal which is fed through conductor 42 to clamp circuit 209 input, causing a silicon controlled rectifier (SCR) 382 (FIG. 4) to be repetitively triggered. A clamping current then flows from the clamp point of the 100 v. power supply 210 through conductor 52, through a resistor 384, the SCR 382, (which is now being repeatedly triggered into conduction) then through conductor 51, through the 6 volt DC supply 204, and conductor 19 to the neutral conductor 15. The effect of this clamping current is to drastically reduce the output voltage level of the 100 v. power supply 210 to approximately 15 volts DC which is substantially below the voltage required to cause neon-type indicator light 211 to light and is also far too low to actuate latch control relay 213 when push button 212 is pressed. Repetitive clamping action will continue to hold power supply 210 output voltage at this drastically reduced level until the sliding brush contact action ceases and the SCR of the clamping circuit 209 is no longer triggered. Since typically 70 volts DC is required to both light the indicator light and actuate the latch control relay, the two levels of voltage delivered by the push button (15 v. to 100 v.) assures freedom from any marginal status of operation.

DC Power Supply (6 volt)204

Figure 2:
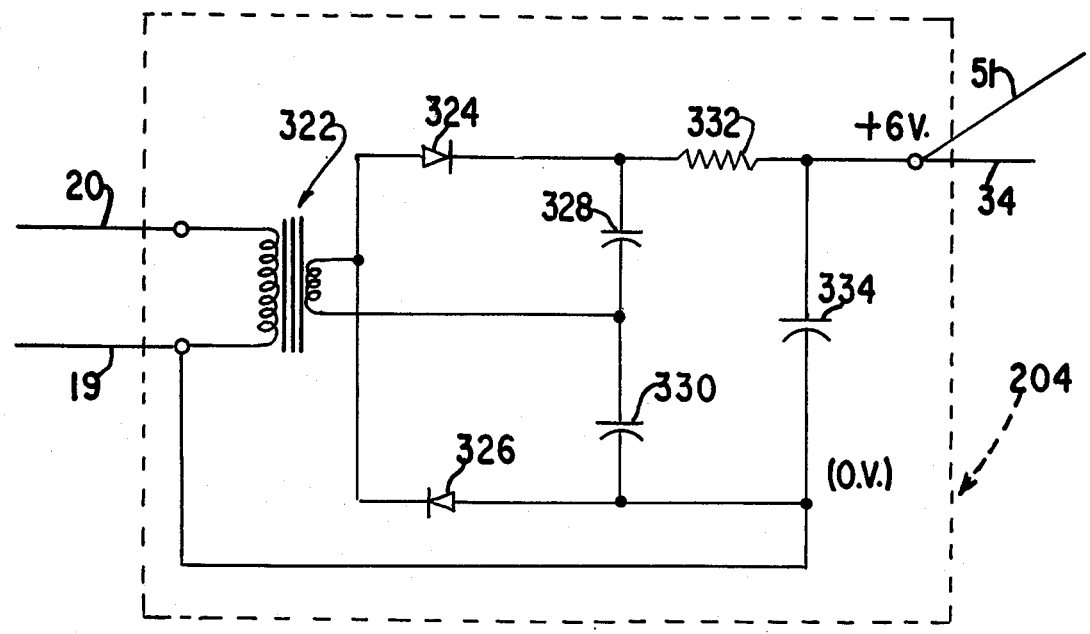

As may be seen in FIG. 2, the 115 volts AC input across conductors 19 and 20 is applied to step-down transformer 322 whose output voltage of 6.3 volts AC is applied to a voltage doubler circuit consisting of diodes 324, 326 and capacitors 328, 330. The DC voltage obtained from this combination is further filtered by resistor 332 and capacitor 334. The negative output lead from this section is connected to AC input lead 19 to provide a current path to the common neutral conductor 15 for purpose of inter-connection with other portions of the system.

Amplifier Power Supply 207

Figure 3:
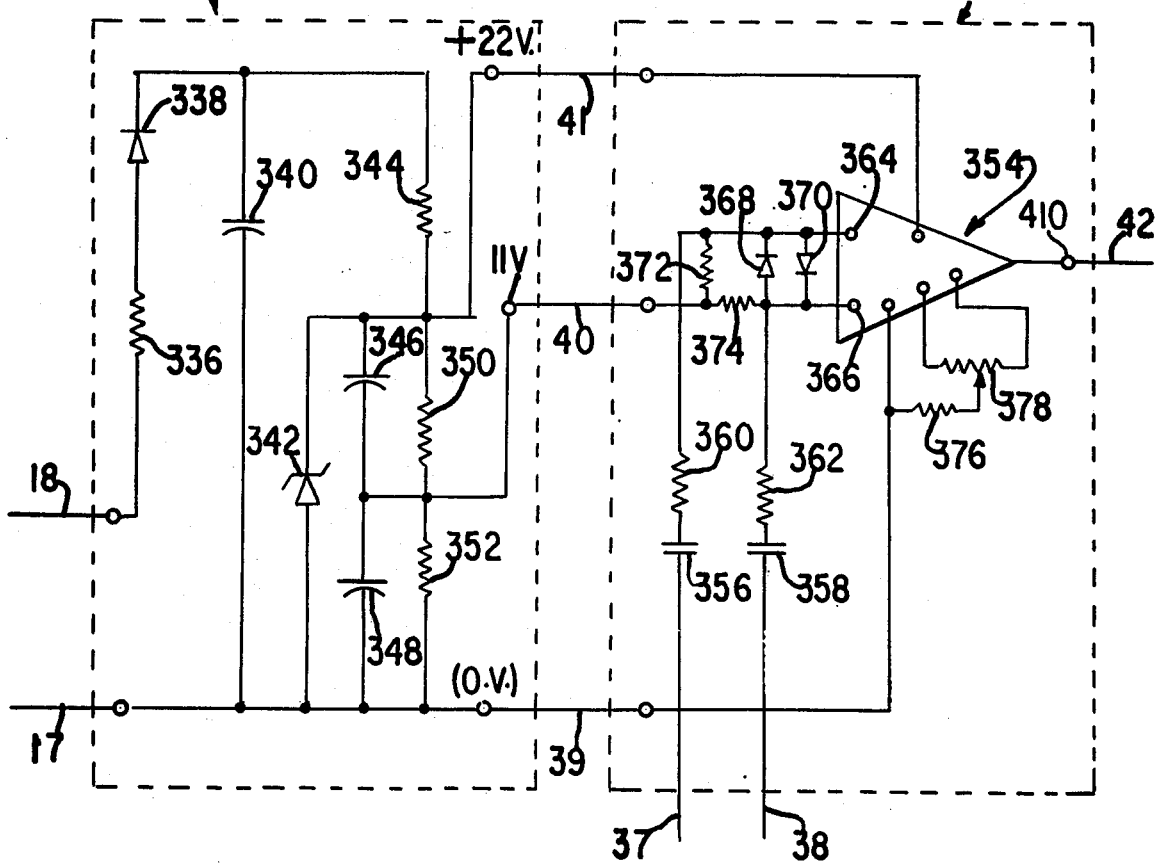

As may be seen in FIG. 3, the 115 volt input power flows from conductor 18 thru current limiting resistor 336 and diode 338 where it becomes pulsating DC current to charge capacitor 340, which filters pulsations. This DC voltage is then applied to zener diode 342 which maintains a 22 volt regulated voltage level across its terminals. A current limiting resistor 344 also provides further filtering in conjunction with capacitors 346 and 348. Resistors 350 and 352 form a voltage divider to provide proper operating voltages for the amplifier section. Output conductor 39 (at zero volts DC) is connected to conductor 17 to provide a path to common neutral conductor 15 for inter-connection purposes. The output of +11 volts is connected to conductor 40; the output of +22 volts is connected to conductor 41.

Amplifier 208

As may also be seen in FIG. 3, the amplifier section 208 consists of a high gain solid state integrated circuit (IC) type 741 amplifier 354 together with the following components, which function as follows.

The signal to be amplified is introduced via conductors 37 and 38, through capacitors 356 and 358, which block DC voltage but allow AC pulsations from sensing resistor 205 to further continue flowing via limiting resistors 360 and 362 to the input terminals 364 and 366 of the amplifier 354. Diodes 368 and 370 perform as signal limiters to prevent possible damage of the amplifier 354 by switching transients originating in the AC power circuits of the centrifuge. Resistors 372 and 374 serve to maintain stable average DC levels at the IC input terminals 364 and 366 with respect to the power supply voltages. Resistors 376 and 378 form an offset control adjustment circuit to accommodate normal minor differences between individual IC amplifiers and thereby obtain maximum output voltage. This amplified output voltage appears at IC terminal 410 as seen in FIG. 3 and is fed to the clamping circuitry via conductor 42.

Clamp Circuit 209

Figure 4:
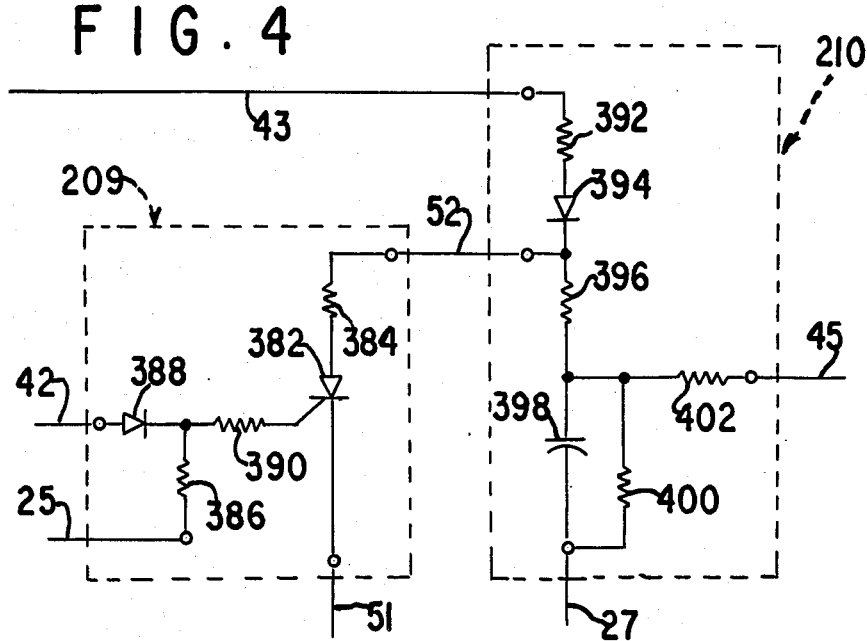

As may be seen in FIG. 4, pulsating DC voltage is derived from the clamp point of the 100 volt DC power supply section 210 through conductor 52 which applies the pulsating voltage to the anode of the SCR 382 through current limiting resistor 384. The cathode of the SCR 382 is connected by the conductor 51 to the +6v. bias voltage supply 204, which also provides a path for current flow to the system common neutral conductor 15 through conductor 19. Resistor 386 serves to stabilize the SCR gate voltage. Pulsating trigger input signals from the amplifier section 208 through conductor 42 are rectified by diode 388 and the resulting positive 20 volt pulses are fed, via limiting resistor 390, to the gate terminal of the SCR. The basic function of the SCR is that it will not pass current from resistor 384 to the bias wire 51 until it is triggered by a pulse that drives the gate voltage more positive than the cathode. At this point, it is triggered into a conductive state and current will flow until the anode voltage falls to a low value whereupon it returns to a non-conducting state again. Continuous triggering pulses due to rotation of the centrifuge thus will cause a corresponding series of clamping actions that hold down the 100 v. power supply output until the centrifuge rotation ceases.

POWER SUPPLY 100 VOLT SECTION 210

As may also be seen in FIG. 4, input 115 v. AC power flows from conductor 43, through limiting resistor 392 then through diode 394, after which it becomes pulsating DC. This current flows through another limiting resistor 396 to charge capacitor 398 to 100–110 volt DC level with negative side of capacitor 398 completing the circuit to common neutral conductor 15 through conductor 27. Resistor 400 serves as a small load on the power supply section to drain off the charge of capacitor 398 when the system "mode" switch is in the "run" position. Resistor 402 is a current limiting resistor selected to provide suitable operating current to properly actuate latch control relay 213 through conductor 45 when clamp circuit 209 is not being triggered. It also serves to further reduce the voltage across capacitor 398 when the clamp circuit 209 is being triggered to further insure that latch control relay 213 will not be actuated while centrifuge is in motion. During the period when clamp circuit 209 is triggered, additional current is drawn from the clamp point through conductor 52. This causes a much greater voltage drop in resistor 392 resulting in a drastic reduction of output voltage supplied to conductor 45.

In a particularly advantageous embodiment the circuit elements have the following values or identification.

| AMPLIFIER CIRCUIT 208 | |
|---|---|
| Detector Resistor 205 | 660 ohms, 10 Watts |
| Amplifier 354 | 741 I.C. |
| Resistor 360, 362 | 1000 ohms, ½ Watt |
| capacitors 356, 358 | 0.05 microfarads, 100 Volt |
| diodes 368, 370 | 1N 659 |
| resistors 372, 374 | 47000 ohms, ½ Watt |
| offset adjust resistor 378 | 10,000 ohms, ¾ Watt |
| resistor 376 | (1000 ohm arm) ½ Watt |
| AMPLIFIER POWER SUPPLY 207 | |
| diode 338 | HEP 170 |
| resistor 336 | 3000 ohms, 10 Watts |
| resistor 344 | 390 ohms, 1 Watt |
| resistors 350, 352 | 1000 ohms, 1 Watt |
| capacitor 340 | 500 microfarads, 50 volts |
| capacitors 346, 348 | 10 microfarads, 25 volts |
| CLAMPING CIRCUIT 209 | |
| resistor 390 | 2200 ohms, ½ Watt |
| SCR 382 | GE C6B |
| diode 388 | HEP 170 |
| resistor 386 | 10000 ohms, ½ Watt |
| resistor 384 | 660 ohms, 4 Watt |
| All diodes are Motorola HEP 170 | |
| Relay 213: | Potter-Brumfield KA11AG DPDT 120v AC 5A. |
| Push Button 212: | Grayhill #4001 |
| Mode Switch 206: | Cutler-Hammer ST52N 8825K5 DPDT 10AMPS |
| Interlock Switch 201: | Potter-Brumfield Type Al G1 117-8 |
| Indicator Light 211: | Industrial Devices #2110 A3 115 v. |
| 6 Volt DC Power Supply 204 | |
| Transformer 322 | Stancor P-6134 115 volts to 6.3 volts, 1.2 Amperes |
| diode 324, 326 | Motorola HEP 170 |
| capacitor 328, 330, 334 | 500 microfarads, 50 volts |
| resistor 332 | 660 ohms, 4 watts |
| 100 Volt DC Power Supply 210 | |
| diode 394 | Motorla HEP 170 |
| capacitor 398 | 16 microfarads, 150 volts |
| resistor 392 | 2000 ohms 10 watts |
| resistor 396 | 3900 ohms 1 watt |
| resistor 400 | 100,000 ohms ½ watt |
| resistor 402 | 2700 ohms 1 watt |

What is claimed is:

1. In a centrifuge of the type having a housing retaining a lid in a closed position and an armature having brushes operatively connected to the rotating portions of the centrifuge, the improved combination comprising:
   a. a latch mounted on the housing;
   b. an enclosure mounted on the housing and adapted to surround the latch and render it tamper-proof in the closed position;
   c. a solenoid mounted on the housing and having a plunger and a spring to push said plunger into engagement with said latch when said solenoid is not actuated thereby preventing opening of said lid;
   d. means to actuate said solenoid thereby moving said plunger out of engagement with said latch and permitting opening of said lid;
   e. means to supply a current through the brushes of the armature;
   f. means to detect a signal and a signal so detected proportional to variations in the current flow through said brushes caused by rotation of the armature;
   g. a clamp circuit responsive to said signal to inactivate said solenoid actuating means thereby preventing opening of the lid when the armature is rotating,
   whereby the lid may not be opened when the armature is rotating regardless of whether the power is on or off.

2. In a safety device for a centrifuge of the type having a housing retaining a lid in a closed position and an armature having brushes operatively connected to the rotating portions of the centrifuge, the improved combination comprising:
   a. a first current source adapted to supply a current through the brushes of the armature;
   b. means to detect a signal so detected proportional to variations in the flow of current through the brushes;
   c. a second current source;
   d. a clamp circuit adapted to be triggered by said detected signal and to cut off the output of said second current source while said signal is being detected;
   e. a latch mounted on the housing;
   f. an enclosure mounted on the housing and adapted to surround the latch and render it tamper-proof in the closed position;
   g. a solenoid mounted on the housing and having a plunger urged into a first position in engagement with said latch, said solenoid being actuated by said second current source to move said plunger into a second position out of engagement with said latch when no signal is being detected whereby the lid can be opened when the armature is not rotating regardless of whether the power is on or off.

3. A safety device as defined in claim 2 where said first current source provides a small direct current of about six volts.

4. A safety device as defined in claim 2 where said second current source provides a direct current of about 100 to 110 volts.

5. A safety device as defined in claim 2 further comprising means to amplify said detected signal.